Feb. 16, 1960     F. F. SEGESMAN     2,925,551
WELL LOGGING SYSTEMS

Filed March 13, 1956                                                     3 Sheets-Sheet 1

*INVENTOR.*
FRANCIS F. SEGESMAN.
BY
HIS ATTORNEY

Feb. 16, 1960   F. F. SEGESMAN   2,925,551
WELL LOGGING SYSTEMS
Filed March 13, 1956   3 Sheets-Sheet 2

INVENTOR.
FRANCIS F. SEGESMAN
HIS ATTORNEY

United States Patent Office

2,925,551
Patented Feb. 16, 1960

2,925,551

WELL LOGGING SYSTEMS

Francis F. Segesman, Ridgefield, Conn., assignor, by mesne assignments, to Schlumberger Well Surveying Corporation, Houston, Tex., a corporation of Texas Application March 13, 1956, Serial No. 571,271

20 Claims. (Cl. 324—1)

This invention relates to methods and apparatus for logging the electrical resistivity of earth formations traversed by a well drilled into the earth. More particularly, the invention concerns the logging of resistivity indications having distinctive characteristics to facilitate accurate determinations of formation resistivities, especially for comparatively thin strata.

There have been devised a number of highly effective systems employing a focused survey current for obtaining detailed electrical logs of earth formations traversed by a well. H. G. Doll Patent Nos. 2,712,627, 2,712,628 and 2,712,629 and M. C. Ferre Patent No. 2,712,631, each issued July 5, 1955, disclose a variety of such focused systems. In such systems, electric fields are established about one or more current emitting electrodes to compel emitted survey current to flow laterally and substantially perpendicularly to the wall of the borehole. The shape of the survey current path is predetermined and maintained substantially constant during a logging operation by emitting auxiliary current in the vicinity of the survey current electrode and controlling the amplitude and phase or polarity of the auxiliary current in accordance with potential differences created by the flow of the currents. As a result, logs made by recording variations in a suitably selected potential difference associated with the flow of current focused in the formations are characterized by considerable detail and represent the resistivities sought to be measured with a relatively high degree of accuracy.

In copending application Serial No. 292,073, filed by N. A. Schuster on June 6, 1952, for "Well Logging Methods and Apparatus," now Patent No. 2,770,771, granted November 13, 1956, well logging systems are disclosed for obtaining substantially equivalent resistivity indications without the necessity for controlling electric fields. As in the focused logging systems, both a survey current and an auxiliary current are emitted from electrodes in the borehole, the electrodes being arranged, if desired, just as are the electrodes in the focused systems where equivalent resistivity indications are to be secured. Rather than employing detected potential differences arising from flow of the currents to control the auxiliary current, these potential differences are processed by means of a computer to derive indications of formation resistivity equivalent to those obtained with a corresponding focused system. Four potential differences or components of potential differences are employed in a derivation of resistivity indications. Two of these may be referred to as "normal" signals, while the remaining two may be referred to as "inverse" signals.

An object of the present invention is to provide novel methods and apparatus for deriving resistivity indications having a different basis but essentially the same utility as indications derived with the well logging systems referred to above.

Another object of the present invention is to provide novel well logging systems affording simultaneous, different indications of formation resistivity for delineating formations in which resistivity varies with radial distance from the borehole.

Still another object of this invention is to provide novel methods and apparatus by which permeable formations may be delineated.

These and other objects are attained in one embodiment of the invention by deriving distinctive indications of formation resistivity during periodic interruptions in the flow of survey current. During alternate periods when survey current is passed into adjacent formations, auxiliary current is emitted with the same polarity and with a magnitude adjusted to create a region of substantially zero potential gradient extending transversely of the borehole wall and defining the path of the survey current. In periods when the survey current is interrupted, the gradient of such region is no longer substantially zero. The auxiliary current is, however, still emitted at its adjusted magnitude. Between a point near such region and a remote reference point, a potential difference is produced by said auxiliary current from which is derived a measure signal representing formation resistivity. The resistivity indications distinctive of this invention are obtained in response to this measure signal. For delineating permeable formations invaded by mud filtrate, resistivity indications are also derived based upon the potential difference produced during periods when survey current is flowing. As a result, two sets of resistivity indications based upon two different current flow patterns through the adjacent earth formations are obtained, one pattern being predominantly influenced by the formation region immediately adjacent the borehole while the other is influenced predominantly by a region farther removed from the borehole. The respective indications may be made identical for thick homogeneous formations where the resistivities of the different formation regions are identical but, in general, will differ for permeable formations where the resistivities of the formation regions differ because of the presence of the mud filtrate in the nearer region, thereby enabling such formations to be more readily delineated.

In another embodiment of the invention, survey and auxiliary currents are introduced into the formations with differing time characteristics. Normal and inverse signals produced by these currents are separately detected in accordance with these time characteristics. By means of a computer, the inverse signal produced by the survey current is amplified by the ratio of the normal and inverse signals produced by the auxiliary current, thereby to obtain the distinctive indications of formation resistivity. Simultaneously, there is added to the amplified inverse signal a normal signal produced by the survey current to obtain indications of resistivity which, by comparison with the distinctive indications, may serve to delineate permeable formations.

In still another embodiment of the invention, in which resistivity indications are derived from a computer, the relative functions of the current emitting electrodes and potential measuring electrodes in the electrode array are transposed.

The invention, together with others of its objects and advantages, will be more fully perceived from the following detailed description of representative embodiments thereof taken in conjunction with the accompanying drawings, in which.

In the figures, like reference numerals are employed to designate similar parts.

Figure 1:
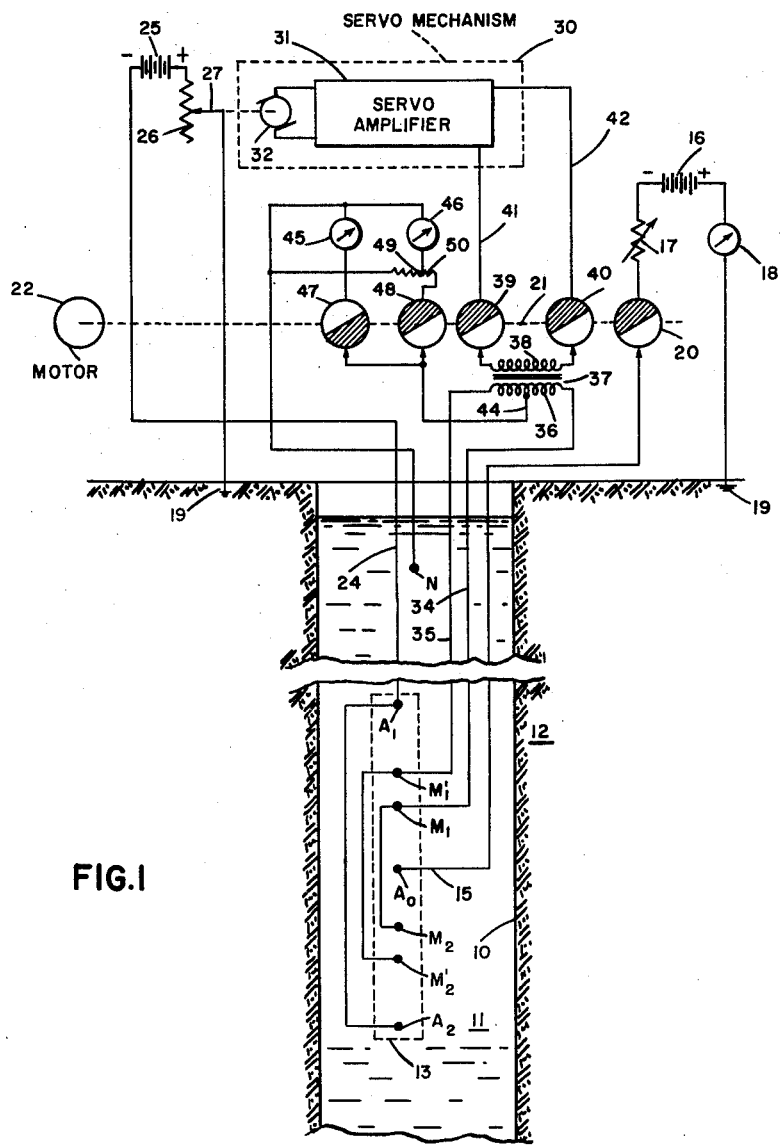
Fig. 1 is a schematic diagram of a well logging system arranged in accordance with the present invention.

In Fig. 1 there is shown a borehole 10 containing electrically conductive drilling liquid 11 and traversing a plurality of earth formations 12. Disposed within the borehole 10 is an array 13 of relatively closely spaced electrodes which may be passed through the borehole by means of a conventional winch and cable combination (not shown). The electrodes of the array 13 are arranged in accordance with the principles set forth in the aforementioned Patent No. 2,712,627 and comprise a central main electrode $A_0$, intermediate pairs of short-circuited electrodes $M_1$ and $M_2$, and $M_1'$ and $M_2'$, respectively, and short-circuited outer electrodes $A_1$ and $A_2$. Preferably, the electrodes are disposed symmetrically about the central electrode $A_0$, the electrodes $M_1$, $M_1'$ and $A_1$ being at increasingly larger distances from the main electrode $A_0$.

Survey current is supplied to the electrode $A_0$ via an insulated cable conductor 15 by a conventional source of electrical energy such as a battery 16 in series with a rheostat 17 and an ammeter 18. A circuit for the survey current is completed by connection of one terminal of the battery 16 to a ground return point 19 remote from the electrode array 13. Interposed in the survey current circuit is a commutator 20 driven through shaft 21 by a motor 22 periodically to interrupt the survey current supplied to the main electrode $A_0$. The commutator 20, for example, may provide for alternate equal periods of current flow and current interruption. If desired, the survey current may also be cyclically reversed during its periods of flow by a reversing commutator of the type described in aforementioned Patent No. 2,712,627. Periodic reversal of the survey current, it will be understood, serves to minimize the effect of polarization impedance at the surface of the electrodes.

Auxiliary current is supplied to the electrodes $A_1$ and $A_2$ through a cable conductor 24 from another source of electrical energy, which may comprise a battery 25 in series with a servo-controlled rheostat 26, the tap 27 of which is connected to a remote ground return point 19. The polarity of the battery 25 with respect to the polarity of battery 16 is such that the survey and auxiliary currents are passed from the electrodes $A_0$ and $A_1$, respectively, with the same polarity. Thus, each of batteries 16 and 25 may have their positive terminal grounded. If the polarity of the auxiliary current is periodically reversed in the manner disclosed in aforementioned Patent No. 2,712,627, the reversal is sequenced so that the emitted auxiliary current is in phase with the emitted survey current.

In accordance with the teachings of copending application Serial No. 248,384, filed in the name of G. K. Gillies on September 26, 1951, for "Servomechanism Control System," now Patent No. 2,752,561, granted June 26, 1956, the auxiliary current is adjusted by a servomechanism 30 in driving connection with the tap 27 of rheostat 26. The servomechanism 30 includes a conventional servo amplifier 31 having its output connected to a servomotor 32 of conventional design to control the position of the servomotor in accordance with the signal applied to the input of the servo amplifier. Depending upon the polarity of the input signal to the servo amplifier 31, its output signal will cause the servomotor 32 to turn in a corresponding direction and to continue turning until the input signal is substantially zero.

With the flow of survey and auxiliary currents of the same polarity from electrodes $A_0$, $A_1$ and $A_2$, there will be induced components of potential difference across the monitoring electrodes $M_1$, $M_1'$ representing the inverse signal $e_{is}$ due to the survey current and the inverse signal $e_{ia}$ due to the auxiliary current. These inverse signals are opposite in polarity and thus tend to cancel one another. When the inverse signals are equal to one another (their ratio being unity), the potential difference across electrodes $M_1$, $M_1'$ is zero.

In accordance with the present invention, the potential difference across the electrodes $M_1$, $M_1'$ is maintained substantially at zero by an adjustment of the auxiliary current only during intervals when the survey current is flowing. To this end, electrodes $M_1$, $M_1'$ are connected by insulated cable conductors 34, 35, respectively, to the primary winding 36 of a transformer 37. The secondary winding 38 of the transformer 37 has its terminals connected through commutators 39, 40 via conductors 41, 42 to the input terminals of the servo amplifier 31. In order that the adjustment of the auxiliary current may occur during the flow of survey current, the commutators 39 and 40 are preferably driven by the shaft 21 in synchronism with the commutator 20 for the survey current and are designed to form a conductive path to the input of the servo amplifier during intervals when the commutator 20 forms a conductive path for the survey current. In other words, the commutators 39, 40 provide for a closing of the potential monitoring circuit which is synchronized with closing of the survey current circuit.

Indications of electrical resistivity of the earth formations surrounding the borehole may be obtained by detecting variations in the potential difference between a point in the vicinity of the main electrode $A_0$ and a remote reference point. This potential difference is of the type which may be characterized as a normal signal and may be obtained, for example, by detecting the potential difference between the electrode $M_1$ and electrode $N$ which is immersed in the liquid 11 at a point remote from the electrode array 13. In the illustrated embodiment of the invention, however, the point at which normal signals are detected is effectively midway between the monitoring electrodes $M_1$, $M_1'$. This effective positioning of the point results from deriving the normal signals from midtap 44 on the primary winding 36 of transformer 37.

In order that simultaneous indications of formation resistivity having different bases may be secured, separate resistivity indicating devices 45, 46 are alternately connected to the midtap 44 via commutators 47, 48 respectively. Commutators 47 and 48 are in driving connection with the shaft 21 for synchronization with commutators 20, 39 and 40. The commutator 47 is arranged to close the measuring circuit through the indicating device 45 when the survey current circuit through commutator 20 is open and the potential monitoring circuit through commutators 39 and 40 is likewise open. The commutator 48, on the other hand, is arranged to close the circuit through the indicating device 46 during intervals when the circuits through commutators 20, 39 and 40 are each closed. Since the indicating device 46 is energized during intervals when the survey current is flowing and the auxiliary current is subject to adjustment, the resistivity indications which it provides correspond with those obtained by apparatus of the type disclosed in Doll Patent No. 2,712,627.

The resistivity indications provided by indicating device 45, however, are distinctive of the present invention and in general differ from the indications provided by device 46. In order that these different resistivity indications may readily be compared, the indicating devices 45 and 46 are preferably separate units of a galvanometric recorder of the type having a record moved as a function of electrode depth in the borehole and customarily employed in well logging operations. Hence, the variations of the two resistivity indications may be recorded contemporaneously as curves referred to the same scale, the speed of motor 22 preferably being high enough that the curves afford substantially continuous indications of the formation resistivity values as a function of depth of the electrode array in the borehole. To obtain accurate resistivity indications against the same scale, the devices 45 and 46 have different sensitivities. Thus, the sensitivity of device 46 is reduced relative to device 45 by connecting device 46 to tap 49 of a precision potential divider 50 having connection between electrode N and commutator 48.

In an exemplary operation of the system shown in Fig. 1, the electrode array 13 as well as the remote reference electrode N are moved through the borehole 10, with the motor 22 energized to operate the commutators 20, 39, 40, 47 and 48 in synchronism and servo amplifier 31 energized to operate the servomotor 32. In the positions of the commutators illustrated in Fig. 1, only the circuit including indicating device 45 is open, the other circuits being closed. Hence, survey current is caused by the battery 16 to flow from the main electrode $A_0$ into the borehole and through the formations 12 to the remote current return point 19. The flow of this survey current creates a potential difference between electrodes $M_1$, $M_1'$ (and $M_2$, $M_2'$) which is the inverse signal $e_{is}$ due to the survey current, referred to above. The simultaneous flow of auxiliary current from the auxiliary electrodes $A_1$, $A_2$ through the formations 12 to the current return point 19 likewise produces an inverse signal.

Thus, auxiliary current flowing from electrodes $A_1$ and $A_2$ creates a potential difference between electrodes $M_1$, $M_1'$ which is the inverse signal $e_{ia}$ referred to above. Because the auxiliary current is of the same polarity as the survey current but emitted on the opposite side of the monitoring electrodes, the inverse signal $e_{ia}$ is opposite in polarity to the invere signal $e_{is}$, and is therefore taken to be negative. If the inverse signals $e_{is}$ and $e_{ia}$ are not equal, a resultant error signal is coupled through transformer 37 to the input of servo amplifier 31, causing the same to adjust the auxiliary current in a direction to bring the inverse signals to equality. As an example, if the inverse signal $e_{ia}$ due to the auxiliary current exceeds the inverse signal $e_{is}$ due to the survey current, the resultant negative signal supplied to the servo amplifier 31 energizes the motor 32 to move the tap 27 away from the positive terminal, thereby increasing the resistance offered by rheostat 26 and diminishing the auxiliary current. Under normal logging conditions, the response of the servo-mechanism 30 is sufficiently rapid that the potential difference between electrodes $M_1$, $M_1'$ is maintained at substantially zero whenever the survey current is flowing.

Since the indicating device 46 is connected to the midtap 44 for response to its potential with respect to ground whenver the survey current flows, the indicating device 46 will accordingly provide resistivity indications which are typical of those obtained with systems like that of the above-noted Patent No. 2,712,627.

To provide resistivity indications which are distinctive of the present invention, the indicating device 45 is connected with the midtap 44 only when the survey current is interrupted. Absent the survey current, the potential midway between monitoring electrode $M_1$, $M_1'$ with respect to ground in a normal signal produced by the auxiliary current alone. In order that this potential may correctly represent the formation resistivity for the same shape of current flow pattern under differing formation resistivity conditions, however, it is necessary that the auxiliary current remain at the value to which it was adjusted in order to bring the ratio of inverse signals to unity. In other words, as the formation resistivity varies, differing amounts of auxiliary current are required to maintain a predetermined shape to the current flow pattern adjacent the central region of the electrode array. This requirement is present for both types of resistivity indications, namely, those obtained when the survey current is flowing and those obtained when the survey current is interrupted. This requirement is met in the case where survey current is flowing by utilizing the servo-mechanism 30 to adjust the auxiliary current to reduce the $M_1$—$M_1'$ potential difference to zeo. This will, likewise, give the proper value for the auxiliary current when the survey current is interrupted, provided the auxiliary current is maintained at its previously adjusted value. Commutators 39 and 40 perform the function of retaining the adjustment of the auxiliary current by interrupting the input to the servo amplifier 31. With no input signal to the servo amplifier 31 during intervals when the survey current is not flowing, the tap 27 for the rheostat 26 remains at the position to which it was driven in the preceding interval.

It may be noted, significantly, that the region of zero potential gradient which extends transversely of the borehole above and below the main electrode exists to define the path of the survey current only when the survey current is flowing. Therefore, the distinctive indications of resistivity are obtained when the vertical potential gradient produced in the region between the electrodes $M_1$, $M_1'$ (or $M_2$, $M_2'$) by the auxiliary current is not zero.

While it may appear remarkable that accurate resistivity indications may be obtained in the absence of survey current flow, it is yet a more remarkable feature of this invention that such distinctive resistivity indications may in some instances be more truly representative of formation resistivities than resistivity indications obtained with the indicating device 46 while survey current is flowing. This is due to the different current flow patterns for the two cases, the distinctive current flow pattern of the present invention yielding a more accurate result under certain earth formation conditions. For example, opposite thin beds or strata more conductive than the surrounding formations, the distinctive resistivity indications of the device 45 may be more accurately representative of the true formation resistivity. It should be observed that the indications afforded by the devices 45 and 46 when recorded, for example, against the same scale do not simply differ by an amount representing the contribution of the survey current. Instead, the readings of the indicating devices 45 and 46 are calibrated, for example, by positioning the electrode array 13 opposite a very thick, homogeneous formation of known resistivity and effecting the adjustments necessary to make the indications of each device accurately representative of the same formation resistivity. The sensitivity of the indicating device 45 is necessarily higher than that of the indicating device 46. Thus, the precision potential divider 50 arranged between the midtap 44 and the indicating device 46 provides ready means for reducing the sensitivity of the indicating device 46 relative to the sensitivity of indicating device 45. With the sensitivities of devices 45 and 46 correctly proportioned, rheostat 17 may be adjusted to fix the survey current at a value giving correct resistivity indications.

To obviate the need for potential divider 50 to fix the relation of sensitivities, the indicating devices 45 and 46 may be alternatively constructed with their sensitivities differently designed in accordance with this fixed relation. Although it normally is desirable to relate the resistivity indications to the same scale of resistivity values, the scales of the devices 45 and 46 may be differently graduated to achieve correct resistivity readings without requiring a difference in sensitivity of the devices, if desired.

As will be particularly evident by superposing the indications of resistivity plotted as a function of depth against the same scale of resistivity values, the distinctive resistivity indications of device 45 differ from the resistivity indications 46 particularly in permeable formations invaded by filtrate of the drilling fluid 11. Since the differences arise from the presence of the filtrate and since invasion of formations by filtrate is a very reliable indication of the permeability of formations, separation of the resistivity indications provided by the system of Fig. 1 affords a relatively reliable delineation of permeable formations. Furthermore, since two substantially simultaneous indications of resistivity are obtainable with the system of Fig. 1, additional data is available which may be employed with so-called departure curves commonly used in analyzing electrical resistivity logs further to improve determinations of true formation resistivities.

In lieu of the electrode array 13 shown in Fig. 1, there may be substituted electrode arrays having a variety of suitable configurations including those disclosed in the above-noted Doll Patent No. 2,712,628, wherein elongated auxiliary electrodes are spaced a short distance above and below a main electrode.

Figure 2:
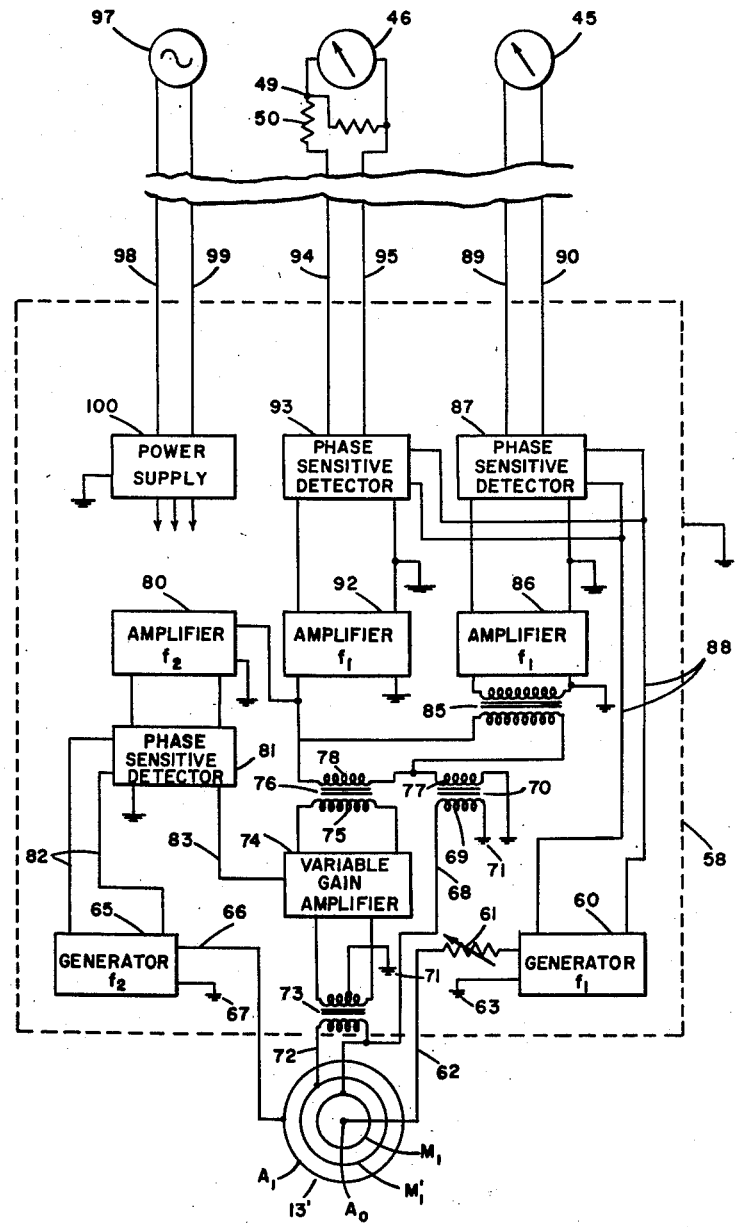
Fig. 2 is a schematic diagram of a well logging system incorporating a computer for obtaining resistivity indications in accordance with the present invention.

In Fig. 2 is shown another embodiment of the invention which incorporates certain of the teachings of above-identified Schuster application Serial No. 292,073. In this embodiment, an analog computer is employed which may be located at the surface of the earth or, as shown, in a pressure-resistant housing 58 adapted to pass through the borehole with an electrode array 13'. Such array 13' is of the type disclosed in aforementioned Patent No. 2,712,629. Along with the computer there may be disposed in the housing 58 a generator 60 for supplying preferably constant survey current at a constant frequency $f_1$ to the center electrode $A_0$ through a high impedance 61 and an insulated conductor 62. The survey current is returned to the generator 60 through a suitable return point 63 which is preferably remote from the electrode array 13' in order to have no appreciable effect upon the electric field thereabout.

A second current generator 65 in the housing 58 is connected by insulated conductor 66 to the ring-like, auxiliary electrode $A_1$ which is disposed concentrically about the main electrode $A_0$. Generator 65 has a return connection through a suitable current return point 67 which is preferably remote from the electrode array 13'. The auxiliary current supplied by the generator 65 is preferably constant in average value and alternating at a constant frequency $f_2$ different from the frequency $f_1$. In contrast to the previously described embodiment of the invention, the auxiliary current is not adjusted in valve and has no significant phase relationship to the survey current. Accordingly, the auxiliary current does not serve to confine or focus the survey current in a beam directed laterally beyond the walls of the borehole. Instead, the survey and auxiliary currents are employed to establish normal and inverse signals which may be combined in accordance with this invention to give both the customary resistivity indications and distinctive, novel resistivity indications.

A normal signal $e_{ns}$ is produced by the survey current as a potential difference of frequency $f_1$ between a point in the vicinity of the main electrode and a remote reference point. The potential difference at frequency $f_2$ produced between these points by the auxiliary current is termed the normal signal $e_{na}$. Inverse signals $e_{is}$ and $e_{ia}$ are produced by the survey and auxiliary currents at frequencies $f_1$ and $f_2$, respectively, as potential differences between a pair of points spaced in the vicinity of the main electrode at different radial distances therefrom. These normal and inverse signals are detected at potential measuring electrodes $M_1$ and $M_1'$ which are spaced intermediate electrodes $A_0$ and $A_1$ at different radial distances from the main electrode $A_0$. The electrodes are spaced in a manner more fully described in above-cited Patent No. 2,712,629.

By means of conductor 68 the electrode $M_1$ is connected to one end of primary winding 69 of a transformer 70, the other end of the primary winding 69 being connected to a remote reference point 71. The potential difference between electrodes $M_1$ and $M_1'$ is applied by conductors 68, 72 to a transformer 73 for coupling to the input of a variable gain amplifier 74. This amplifier 74 may be of conventional design incorporating a variable gain stage or section in a well-known manner. Preferably, the gain of the amplifier 74 is sufficiently constant with respect to frequency that signals of either frequency $f_1$ or $f_2$ experience the same gain G. The output of the variable gain amplifier 74 is applied across primary winding 75 of a transformer 76.

It will be observed that normal signals of both frequencies $f_1$ and $f_2$ are applied to primary winding 69 of transformer 70, while inverse signals of both frequencies are applied across primary winding 75 of transformer 76. In order to obtain the product of the inverse signal $e_{is}$ due to the survey current amplified by the ratio of the normal and inverse signals $e_{na}$ and $e_{ia}$ due to the auxiliary current, the normal and inverse signals $e_{na}$ and $e_{ia}$ are algebraically added by connecting in series, secondary winding 77 of transformer 70 and secondary winding 78 of transformer 76. These algebraically added signals are actually of opposite polarity by a proper connection of the transformer. Hence, it is the difference of the signals $e_{na}$ and $e_{ia}$ referred to ground which is supplied to a conventional amplifier 80 tuned to the frequency $f_2$. The output of amplifier 80 is coupled to the input of phase-sensitive detector 81 of any convenient design such as that described at pages 254–256 of the "Review of Scientific Instruments" (vol. 22, April 1951) in an article by N. A. Schuster. The detector 81 is supplied via conductors 82 with a reference signal from generator 65 of frequency $f_2$. Accordingly, the detector 81 serves to provide a rectified version of the difference signal at frequency $f_2$ derived from amplifier 80. This rectified version of the difference signal, referred to ground, is supplied as degenerative feedback to the variable gain section of the amplifier 74 via conductor 83.

Since the feedback is degenerative, the gain G of variable gain amplifier 74 is adjusted to set the amplified inverse signal $Ge_{ia}$ equal to the normal signal $e_{na}$, whereupon the gain G is made substantially equal to the ratio $e_{na}/e_{ia}$.

In accordance with the present invention, distinctive resistivity indications are derived from the inverse signal $e_{is}$ when amplified by the ratio $e_{na}/e_{ia}$ to which the gain G is set by feedback action. As the inverse signal $e_{is}$ due to the survey current is amplified by this ratio in the variable gain amplifier 74, distinctive resistivity indications may be obtained by utilizing the potential developed across the secondary winding 78 of transformer 76. To this end, secondary winding 78 is coupled via isolating transformer 85 to a conventional amplifier 86 tuned to the frequency $f_1$ for increasing the signal level. The output of amplifier 86 is coupled to a phase-sensitive detector 87 similar to detector 81 but supplied with a reference signal at frequency $f_1$ from generator 60 via conductors 88. The output of the detector 87, which is a rectified version of the amplified inverse signal $Ge_{is}$, is supplied via cable conductors 89, 90 to the device 45 for providing distinctive indications of formation resistivity.

Resistivity indications of the type customarily obtained may also be provided for comparison purposes. In a manner taught in above-mentioned application Serial No. 292,073, the total signal across the secondary windings 77 and 78 with respect to ground is supplied via amplifier 92, tuned at frequency $f_1$, to a phase-sensitive detector 93. Like detector 87, detector 93 is supplied with a reference signal at frequency $f_1$. The rectified output of detector 93 is supplied via cable conductors 94, 95 to the indicating device 46. To reduce the sensitivity of the indicating device 46 to the rectified signal supplied by detector 93, the precision potential divider 50 is interposed in this measuring circuit. Thus, the potential divider 50 is connected in shunt between conductors 94 and 95, tap 49 again being connected to device 46.

To energize the generators 60 and 65 as well as other electronic apparatus within the housing 58, a source 97 of electrical energy located at the earth's surface is connected by cable conductors 98, 99 to a suitable power supply 100 contained within the housing 58.

In the exemplary operation of the embodiment of Fig. 2, survey current at frequency $f_1$ derived from generator 60 is emitted at the main electrode $A_0$ as the electrode array 13' together with the housing 58 is moved through the borehole past formations to be investigated. Simultaneously but at the different frequency $f_2$, auxiliary current is introduced into the borehole from auxiliary electrode $A_1$. Passage of the auxiliary current into the formations creates at the frequency $f_2$ an inverse signal $e_{ia}$ across electrodes $M_1$, $M_1'$ and a normal signal $e_{na}$ between electrode $M_1$ and ground. By supplying the difference of these signals formed in the secondary windings 77, 78 to the gain control loop for variable gain amplifier 74, gain G of amplifier 74 is adjusted to equal the ratio $e_{na}/e_{ia}$.

When the inverse signal $e_{is}$ created between electrodes $M_1$, $M_1'$ by the survey current is amplified in the variable gain amplifier 74 by this gain G, there is induced across the secondary winding 78 a signal which is supplied in rectified form to the indicating device 45 to provide the distinctive resistivity indications in accordance with the present invention. Simultaneously, by adding to the potential across secondary winding 78, the potential of secondary winding 77 representing the normal signal $e_{ns}$ and applying the total signal to the indicating device 46 in a rectified form, resistivity indications of the type customarily secured may be obtained. Because the normal signal $e_{ns}$ due to the survey current affects the resistivity indications of the device 46 and not those of the device 45, the sensitivity of the device 46 is reduced in a suitable fixed proportion by the potential divider 50. Thus, each of the devices 45 and 46 may provide accurate indications of resistivity, these resistivity indications being accurately representative of the resistivity of the zone in permeable formations which is invaded by filtrate of the drilling fluid 11.

In some instances the resistivity indications of device 45 are more accurately representative of this invaded zone resistivity and, in any event, the simultaneous indications of devices 45, 46 allow the desired resistivity values to be determined with a very high degree of accuracy. In permeable formations invaded by filtrate, the distinctive indications of device 45 will usually give higher readings of resistivity than the indications of device 46, while identical indications may be expected in impervious formations. In a recorded log of the indications obtained with devices 45 and 46, the separation in the indications opposite permeable formations allows such formations to be accurately delineated.

Figure 3:
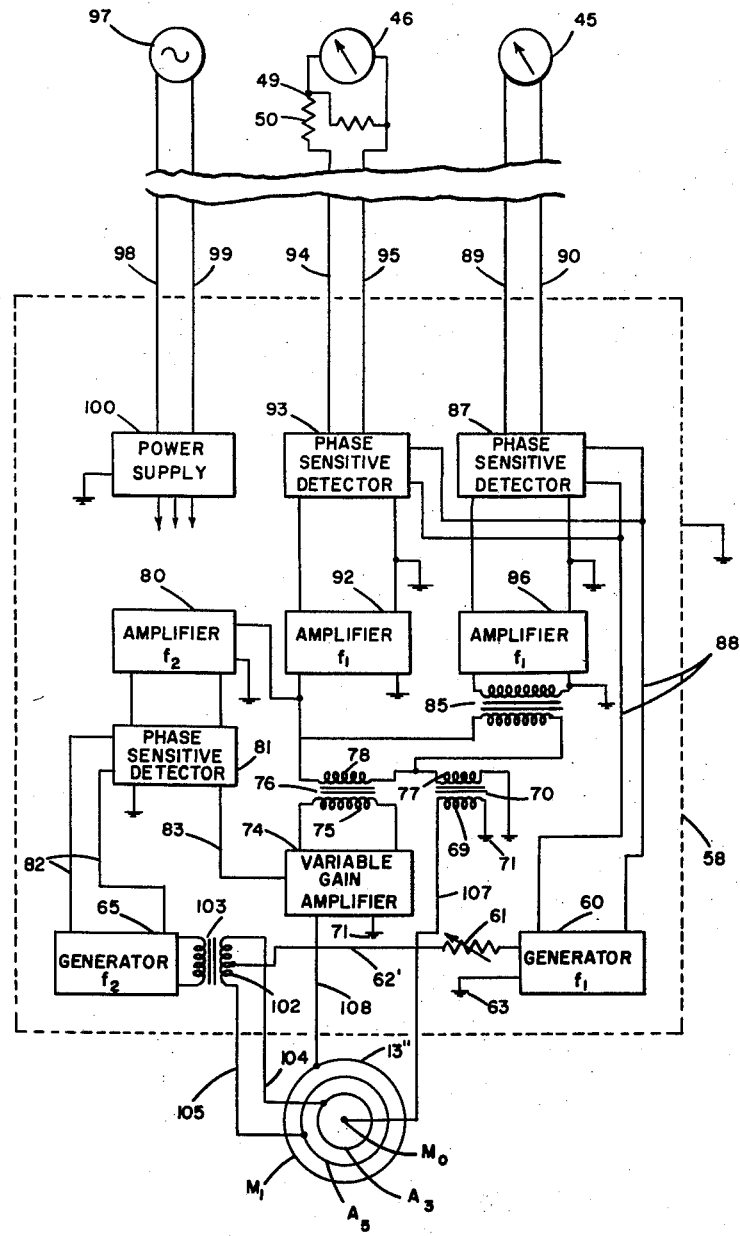
Fig. 3 is a schematic diagram of a further modification of the present invention, in which the current emitting electrodes and potential measuring electrodes are functionally transposed in relation to the electrodes of Fig. 2.

Pursuant to the teachings of above-mentioned Patent No. 2,712,631, the distinctive resistivity indications of this invention may be obtained by a modification in which the current carrying electrodes and potential measuring electrodes of either of the foregoing systems are transposed in function. To exemplify such transposition, there is shown in Fig. 3 an embodiment of the invention similar to that of Fig.2 but employing an electrode array 13″ in which the inner electrode $M_0$ serves for the measurement of potential, main electrode $A_3$ and auxiliary electrode $A_5$ at successively greater radial distances serve to emit current into the borehole and electrode $M_1$ spaced thereabout serves for potential measurement. To transpose the functions of the electrodes, generator 60 is connected by conductor 62′ ot the midtap of secondary winding 102 for transformer 103. By means of conductors 104, 105 this secondary winding 102 is connected between the main current electrode $A_3$ and the auxiliary current electrode $A_5$ disposed thereabout, so that survey current is passed not only from the main electrode but also from the auxiliary electrode into the surrounding formations. If desired, however, survey current may be emitted solely from the main electrode $A_3$.

Primary winding 106 of the transformer 103 is connected across the output terminals of the generator 65. 65 to the current electrodes $A_3$ and $A_5$ so as to pass auxiliary current at the frequency $f_2$ between these electrodes. Hence, the transformer 103 serves to couple the generator 65 to the current electrodes $A_3$ and $A_5$ so as to pass auxiliary current at the frequency $f_2$ between these electrodes. Both the survey and the auxiliary currents are then passed from each of the current electrodes $A_3$ and $A_5$, although only the survey current is passed to a remote current return point, namely, to the current return point 63.

Since the survey current is returned at a remote point, normal signals $e_{n0}$ and $e_{n1}$ are created, respectively, at the measure electrodes $M_0$ and $M_1$. At the same time, passage of auxiliary current between the adjacent electrodes $A_3$ and $A_5$ creates inverse signals $e_{i0}$ and $e_{i1}$ on the same respective electrodes $M_0$ and $M_1$. By means of conductor 107 connecting center electrode $M_0$ to the primary winding 69 of transformer 70, the normal and inverse signals $e_{n0}$ and $e_{i0}$ are introduced into the computer circuit with reference to a suitable ground 71. Similarly, conductor 108 connects outer measuring electrode $M_1$ to the input of the variable gain amplifier 74 to introduce the normal and inverse signals $e_{n1}$ and $e_{i1}$ with reference to ground. The remainder of the circuitry is arranged just as is described in conjunction with Fig. 2.

In an exemplary operation of this embodiment of Fig. 3, the electrode arrays 13″ together with the housing 58 is moved through the well past formations to be investigated. Survey current from the generator 60 is passed at the frequency $f_1$ from electrodes $A_3$ and $A_5$ to create the normal signals $e_{n0}$ and $e_{n1}$ at the electrodes $M_0$ and $M_1$, respectively. Simultaneously, the auxiliary current at frequency $f_2$ is passed between electrodes $A_3$ and $A_5$ to create the inverse signals $e_{i0}$ and $e_{i1}$ at the respective measuring electrodes $M_0$ and $M_1$. It will be observed that the normal and inverse signals at either of electrodes $M_0$ or $M_1$ may be differentiated inasmuch as their frequencies are $f_1$ and $f_2$, respectively.

To obtain the distinctive resistivity indications in accordance with this invention, it is necessary that a signal be derived from the computer circuitry proportional to the normal signal $e_{n1}$ amplified by the ratio of inverse signals $e_{i0}/e_{i1}$. To set the gain G of the variable gain amplifier 74 equal to this ratio, the inverse signal $e_{i0}$ is coupled to the secondary winding 77 of transformer 70, while the inverse signal $e_{i1}$ is amplified by the gain G and coupled to the secondary winding 78 of transformer 76. Since the measuring electrodes $M_0$ and $M_1$ are on opposite sides of current electrodes $A_3$ and $A_5$, the inverse signals $e_{i0}$ and $e_{i1}$ are in phase opposition. Thus, algebraic addition of these signals in the secondary windings 77 and 78 results in application of a signal to amplifier 80 at the frequency $f_2$ proportional to the difference between the inverse amplified signal $Ge_{i1}$ and the inverse signal $e_{i0}$. By degeneratively controlling the gain of variable gain amplifier 74 in accordance with a rectified version of this difference signal, the gain G is set equal to the desired ratio $e_{i0}/e_{i1}$.

Accordingly, when the normal signal $e_{n1}$ of frequency $f_1$ at electrode $M_1$ is amplified by this gain G, there is derived across the secondary winding 78 a measure signal proportional to $e_{n1} \cdot e_{i0}/e_{i1}$. This latter signal is amplified in amplifier 86 and a rectified version thereof supplied to the indicating device 45 for obtaining the desired distinctive indications of resistivity. Simultaneously, there is applied to the amplifier 92 not only the signal across secondary winding 78 but also the signal across secondary winding 77 with reference to ground. This total measure signal, which represents formation resistivity in accordance with the customary basis, is amplified and in rectified form is supplied to the indicating device 46. As before, the sensitivity of the indicating device 46 is diminished relative to that of indicating device 45 by appropriate means, such as the potential divider 50.

As the invention is generally applicable to systems of the type disclosed in the aforementioned patents and patent applications, it should be evident that the embodiments of the invention described above are not indicative of the limits of the invention but merely exemplify its principles. Thus, while the electrodes of the array 13 have a longitudinal symmetry and alignment and electrodes of the arrays 13′ and 13″ are confocal and have a radial symmetry, the invention is applicable to electrode arrays which are not symmetrical, as are described in aforementioned Patent No. 2,712,627, and to electrode arrays which are aligned horizontally rather than longitudinally of a borehole, such as shown in Bricaud application Serial No. 434,580 filed June 4, 1954, for "Electrical Logging of Subterranean Formations," now Patent No. 2,750,557, granted June 12, 1956, and assigned to the assignee of the present application. Although the survey current is conveniently supplied with a steady average value, the survey current may be allowed to change in value, for example, in the manner taught in copending application Serial No. 419,762, filed March 30, 1954, by F. P. Kokesh for "Electrical Well Logging," now Patent No. 2,776,402, granted January 1, 1957. Rather than adjusting the sensitivities of the indicating devices 45 and 46 internally or externally by a potential divider, correct resistivity indications may be obtained, for example, by providing the amplifier 86 with a higher gain than amplifier 92. In some applications, the difference or other linear combination of the resistivity signals may be indicated to facilitate delineation of zones of interest.

As the invention is susceptible to these and other modifications within the ambit of its principles, the invention is not intended to be limited to the specific embodiments shown and described but is of a scope defined in the appended claims.

I claim:

1. In a method for investigating the resistivity of earth formations traversed by a borehole, the steps of passing survey current between one location in a borehole and a current return point through adjacent earth formations, detecting a potential difference between spaced apart points near said one location, passing auxiliary current to a current return point from locations in the borehole proximate to and disposed about said one location with a magnitude and sense to reduce the detected potential difference substantially to zero, interrupting said survey current while maintaining said auxiliary current, and obtaining indications of the potential difference between a point spaced near said one location and a remote reference point while said survey current is interrupted.

2. In a method for investigating the resistivity of earth formations traversed by a borehole, the steps of passing survey current between one location in a borehole and a remote current return point through adjacent earth formations, detecting a potential difference between spaced apart points near said one location, passing auxiliary current to a remote current return point from locations in the borehole proximate to and disposed about said one location, adjusting the magnitude and sense of said auxiliary current to reduce the detected potential difference substantially to zero, interrupting said survey current while maintaining said auxiliary current at its adjusted value, and deriving indications of the potential difference between a point spaced near said one location and a remote reference point while said survey current is interrupted.

3. In a method for investigating the resistivity of earth formations traversed by a borehole, the steps of passing survey current between one location in a borehole and a remote current return point through adjacent formations, passing auxiliary current to a remote current return point from locations in the borehole proximate to and spaced above and below said one location, detecting a potential difference between points longitudinally spaced intermediate said locations, adjusting said auxiliary current while said survey current is being passed to reduce the detected potential difference substantially to zero, periodically interrupting said survey current while maintaining said auxiliary current at its adjusted value, and deriving indications of the potential difference between a point longitudinally spaced near said one location and a remote reference point while said survey current is interrupted.

4. In a method for investigating the resistivity of earth formations traversed by a borehole, the steps of passing survey current between at least one location in a borehole and a current return point through adjacent earth formations, passing auxiliary current from a location in the borehole disposed adjacent said one location to a current return point, detecting a normal signal at a point in the vicinity of said locations produced by one of said currents, detecting a pair of inverse signals in the vicinity of said locations produced by at least one of said currents, and obtaining complete indications of formation resistivity directly proportional to only the product of said normal signal and the ratio of said inverse signals.

5. In a method for investigating the resistivity of earth formations traversed by a borehole, the steps of passing survey current between one location in a borehole and a remote current return point through adjacent earth formations, passing auxiliary current to a remote current return point from locations in the borehole proximate to and disposed about said one location, detecting the potential difference produced by said auxiliary current between a point in the vicinity of said one location and a remote reference point to derive a normal signal, detecting the potential differences produced respectviely by said survey and said auxiliary currents at points spaced intermediate said locations to derive corresponding inverse signals, and obtaining complete indications of formation resistivity directly proportional to only the product of said normal signal and the ratio of said inverse signals.

6. In a method for investigating the resistivity of earth formations traversed by a borehole, the steps of passing survey current between one location in a borehole and a remote current return point through adjacent earth formations, passing auxiliary current to a remote current return point from locations in the borehole proximate to and disposed about said one location, detecting a potential difference produced by said auxiliary current between a point intermediate said locations and a remote reference point to derive a normal signal, detecting potential differences produced respectively by said survey and said auxiliary currents between spaced apart points near said one location to derive corresponding inverse signals, amplifying said survey current inverse signal by the ratio of said auxiliary current normal and inverse signals, and obtaining complete indications of formation resistivity directly proportional to only said amplified survey current inverse signal.

7. In a method for investigating the resistivity of earth formations traversed by a borehole, the steps of passing survey current between one location in the borehole and a remote current return point through adjacent earth formations, passing auxiliary current to a current return point from locations in a borehole proximate to and disposed about said one location, detecting potential differences produced by said survey and auxiliary currents between a pair of spaced apart points near said one location to derive corresponding inverse signals, detecting the potential differences produced by said survey and auxiliary currents between a point spaced near said one location and a remote reference point to derive corresponding normal signals, obtaining a first set of complete indications of formation resistivity directly proportional to only the product of the normal signal corresponding to said auxiliary current and the ratio of said inverse signals, and contemporaneously deriving a second set of complete indications of formation resistivity directly proportional to the sum of the product of the normal signal corresponding to said auxiliary current times the ratio of said inverse signals and the normal signal corresponding to said survey current.

8. In a method for investigating the resistivity of earth formations traversed by a borehole, the steps of passing survey current between a first location in a borehole and a remote current return point through adjacent earth formations, passing auxiliary current between nearby locations in the borehole in the vicinity of said first location, said locations being of generally circular configuration, detecting a potential difference produced by said survey current between a point spaced outwardly of said locations and a remote reference point to derive a normal signal, detecting potential differences produced by said auxiliary current between a remote reference point and respectively said outer point and an inner point spaced centrally of said locations to derive corresponding inverse signals, amplifying the normal signal at said outer point by the ratio of said inverse signals, and obtaining complete indications of formation resistivity directly proportional to only said amplified normal signal.

9. In well logging apparatus, the combination comprising a main electrode adapted to be lowered into a borehole, electric source means coupled to said main electrode and to a current return point for passing survey current from said main electrode into adjacent formations, auxiliary electric source means responsive to the potential difference between a pair of spaced apart points near said main electrode for emitting auxiliary current of adjusted magnitude and proper polarity above and below said main electrode from electrodes spaced thereabout to establish between said pair of points a region of zero potential gradient defining the path of said survey current and extending transversely of the borehole wall, means for interrupting said survey current while maintaining said auxiliary current, means for picking up the potential difference between a point in the vicinity of said pair of points and a reference point while said survey current is interrupted, and means for indicating the value of said picked-up potential difference.

10. In well logging apparatus, the combination comprising a main electrode adapted to be lowered into a borehole, electric source means coupled to said main electrode and to a remote current return point for passing survey current from said main electrode into adjacent formations, auxiliary electric source means responsive to the potential difference between a pair of spaced apart points near said main electrode for emitting auxiliary current of adjusted magnitude and proper polarity above and below said main electrode from electrodes spaced thereabout to establish between said pair of points a region of zero potential gradient defining the path of said survey current and extending transversely of the borehole wall, means for periodically interrupting said survey current while maintaining said auxiliary current at its adjusted magnitude, and means responsive to the potential difference produced between a point in the vicinity of said pair of points and a remote reference point while said survey current is interrupted for obtaining indications of formation resistivity.

11. In well logging apparatus, the combination comprising a main electrode adapted to be lowered into a borehole, an auxiliary electrode including portions spaced above and below said main electrode, and potential measuring electrodes spaced intermediate said main and auxiliary electrodes, electric source means coupled to said main electrode and to a remote current return point for passing survey current from said main electrode into adjacent formations, auxiliary electric source means responsive to the potential difference between said potential measuring electrodes for emitting auxiliary current of adjusted magnitude and proper polarity from said auxiliary electrode to establish between said measuring electrodes a region of zero potential gradient defining the path of said survey current and extending transversely of the borehole wall, means for periodically interrupting said survey current while maintaining said auxiliary current at its adjusted magnitude, and means coupled to at least one of said potential measuring electrodes and to a remote reference point for obtaining indications of formation resistivity while said survey current is interrupted.

12. In well logging apparatus, the combination comprising a main electrode, an auxiliary electrode including portions spaced longitudinally above and below said main electrode and a pair of potential measuring electrodes longitudinally spaced intermediate said main and auxiliary electrodes, said electrodes adapted to be lowered in fixed spaced relation into a borehole, electric source means coupled to said main electrode and to a remote current return point for passing survey current from said main electrode into adjacent formations, auxiliary electric source means responsive to the potential difference between said measuring electrodes for passing auxiliary current of adjusted magnitude and proper polarity from said auxiliary electrode to a remote current return point to establish between said measuring electrodes a region of zero potential gradient defining the path of said survey current and extending transversely of the borehole wall, means for periodically interrupting said survey current while maintaining said auxiliary current at its adjusted magnitude, and means coupled to at least one of said measuring electrodes and to a remote reference point and responsive to the potential difference therebetween for deriving indications of formation resistivity while said survey current is interrupted.

13. In well logging apparatus, the combination comprising a main electrode and an auxiliary electrode including portions spaced above and below said main electrode adapted to be lowered together into a borehole, electric source means coupled to said main electrode and to a current return point for passing survey current from said main electrode into adjacent formations, auxiliary electric source means coupled to said auxiliary electrode and to a current return point for passing auxiliary current therebetween, means responsive to the potential at a point in the vicinity of said main electrode with respect to a reference point produced by one of said currents to derive a normal signal, means responsive to the potentials at a pair of spaced apart points near said main electrode produced by at least one of said currents for deriving a pair of inverse signals, means for deriving a measure signal directly proportional to only the product of said normal signal and the ratio of said inverse signals, and means for obtaining complete indications of formation resistivity directly proportional to only said measure signal.

14. In well logging apparatus, the combination comprising a main electrode, an auxiliary electrode including portions spaced above and below said main electrode, and measuring electrodes spaced intermediate said main and auxiliary electrodes, all of said electrodes adapted to be lowered into a borehole, electric source means coupled to said main electrode and to a remote current return point for passing survey current from said main electrode into adjacent formations, auxiliary electric source means coupled to said auxiliary electrode and to a remote current return point for passing auxiliary current therebetween, the potential differences between said measuring electrodes produced by said survey and auxiliary currents being corresponding inverse signals, computer means for deriving a first measure signal directly proportional to only the product of the ratio between the inverse signals produced by said survey and auxiliary currents respectively and a normal signal produced by said auxiliary current as a potential of a point in the vicinity of said measuring electrodes with respect to a reference potential and for deriving a second measure signal directly proportional to the sum of said first measure signal and a normal signal produced by said survey current as a potential of a point in the vicinity of said measuring electrodes with respect to a reference potential, and means for obtaining separate indications of formation resistivity having different bases in response to said measure signals.

15. In well logging apparatus, the combination comprising a cushion member arranged to be lowered into a borehole in contact with the wall thereof, a main electrode inlaid in the face of said cushion member, an auxiliary electrode concentric with said main electrode inlaid in the face of said cushion member and measuring electrodes spaced intermediate said main and auxiliary electrodes and inlaid in the face of said cushion member, electric source means coupled to said main electrode and to a remote current return point for passing survey current from said main electrode into adjacent formations, auxiliary electric source means coupled to said auxiliary electrode and to a remote current return point for passing auxiliary current therebetween, the potential differences produced between said measuring electrodes by said survey and auxiliary currents being corresponding inverse signals, a normal signal being produced by said auxiliary current as the potential of a point in the vicinity of said measuring electrodes with respect to a remote reference point, computer means for deriving the product of said normal signal and the ratio of the inverse signals corresponding to said survey and auxiliary currents for providing a measure signal, and means responsive to only said measure signal for obtaining complete indications of formation resistivity.

16. In well logging apparatus, the combination comprising a first measuring electrode, a second measuring electrode including portions spaced above and below said first measuring electrode, and a pair of current emitting electrodes spaced intermediate said first and second measuring electrodes and including portions above and below said first measuring electrode, all of said electrodes adapted to be lowered into a borehole, electric source means coupled to at least one of said current emitting electrodes and to a remote current return point for passing survey current into adjacent formations, auxiliary electric source means coupled to said current emitting electrodes for passing auxiliary current therebetween, the potential of said second measuring electrode with respect to a remote reference point produced by said survey and auxiliary currents being respectively a normal and an inverse signal, the potential of said first measuring electrode with respect to a remote reference point produced by said auxiliary current being an inverse signal, computer means responsive to said signals for deriving a measure signal proportional to only the product of the inverse signal at said first measuring electrode and the ratio of the normal and inverse signals at said second measuring electrode, and means responsive to only said measure signal for obtaining complete indications of formation resistivity.

17. In well logging apparatus, the combination comprising a main electrode and an auxiliary electrode including portions spaced above and below said main electrode adapted to be lowered together into a borehole, electric source means coupled to said main electrode and to a remote current return point for passing survey current from said main electrode into adjacent formations, auxiliary electric source means coupled to said auxiliary electrode and to a remote current return point for passing auxiliary current therebetween, computer means including a variable gain amplifier and a gain control circuit for setting the gain of said amplifier equal to the ratio of potential differences produced respectively between a point in the vicinity of said main electrode and a remote reference point and between a pair of points spaced intermediate said main and auxiliary electrodes by said auxiliary current, said amplifier being responsive to the potential difference produced between said pair of points by said survey current for amplifying the same by said ratio to derive a measure signal, and means responsive to only said measure signal for providing complete indications of formation resistivity.

18. In a method for investigating the resistivity of earth formations traversed by a borehole, the steps of passing survey current between one location in a borehole and a remote current return point through adjacent earth formations, passing auxiliary current to a remote current return point from locations in the borehole proximate to and disposed about said one location, detecting potential differences produced respectively by said survey and said auxiliary currents between a point intermediate said locations and a remote reference point to derive corresponding normal signals, detecting potential differences produced respectively by said survey and said auxiliary currents between spaced apart points near said one location to derive corresponding inverse signals, amplifying said survey current inverse signal by the ratio of said auxiliary current normal and inverse signals, obtaining a first set of complete indications of formation resistivity directly proportional to only said amplified survey current inverse signal, and contemporaneously obtaining a second set of complete indications of formation resistivity directly proportional to the sum of the survey current normal signal plus said amplified survey current inverse signal.

19. In a method for investigating the resistivity of earth formations traversed by a borehole, the steps of passing survey current between a first location in a borehole and a remote current return point through adjacent earth formations, passing auxiliary current between nearby locations in the borehole in the vicinity of said first location, said locations being of generally circular configuration, detecting potential differences produced by said survey current between a remote reference point and respectively a point spaced outwardly of said locations and an inner point spaced centrally of said locations to derive corresponding normal signals, detecting potential differences produced by said auxiliary current between a remote reference point and respectively said outer and said inner points to derive corresponding inverse signals, amplifying the normal signal at said outer point by the ratio of said inverse signals, obtaining a first set of complete indications of formation resistivity directly proportional to only said amplified normal signal, and contemporaneously obtaining a second set of complete indications of formation resistivity directly proportional to the sum of the normal signal at said inner point plus said amplified normal signal.

20. In well logging apparatus, the combination comprising a main electrode and an auxiliary electrode including portions spaced above and below said main electrode adapted to be lowered together into a borehole, electric source means coupled to said main electrode and to a remote current return point for passing survey current from said main electrode into adjacent formations, auxiliary electric source means coupled to said auxiliary electrode and to a remote current return point for passing auxiliary current therebetween, computer means including a variable gain amplifier and a gain control circuit for setting the gain of said amplifier equal to the ratio of potential differences produced respectively between a point in the vicinity of said main electrode and a remote reference point and between a pair of points spaced intermediate said main and auxiliary electrodes by said auxiliary current, said amplifier being responsive to the potential difference produced between said pair of points by said survey current for amplifying the same by said ratio to derive a first measure signal, circuit means for adding to said first measure signal a signal representative of the potential difference produced between a point in the vicinity of said main electrode and a remote reference point by said survey current to derive a second measure signal, and means separately responsive to said first and second measure signals for providing two different indications of formation resistivity.

References Cited in the file of this patent

UNITED STATES PATENTS

| | | |
|---|---|---|
| 2,712,627 | Doll | July 5, 1955 |
| 2,712,628 | Doll | July 5, 1955 |
| 2,712,629 | Doll | July 5, 1955 |
| 2,712,631 | Ferre | July 5, 1955 |
| 2,770,771 | Schuster | Nov. 13, 1956 |